(12) United States Patent
Peng et al.

(10) Patent No.: US 12,069,559 B2
(45) Date of Patent: Aug. 20, 2024

(54) INTER-SLICE SHARING IN 5G CORE NETWORKS

(71) Applicant: HUAWEI TECHNOLOGIES CO., LTD., Shenzhen (CN)

(72) Inventors: Chenghui Peng, Shanghai (CN); Xun Xiao, Munich (DE); Xueli An, Munich (DE); Jianjun Wu, Shanghai (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 657 days.

(21) Appl. No.: 17/183,799

(22) Filed: Feb. 24, 2021

(65) Prior Publication Data

US 2021/0204191 A1 Jul. 1, 2021

Related U.S. Application Data

(63) Continuation of application No. PCT/EP2018/073142, filed on Aug. 28, 2018.

(51) Int. Cl.
*H04W 40/32* (2009.01)
*G06F 9/455* (2018.01)
*H04L 41/12* (2022.01)
*H04W 76/12* (2018.01)

(52) U.S. Cl.
CPC ........ *H04W 40/32* (2013.01); *G06F 9/45558* (2013.01); *H04L 41/12* (2013.01); *H04W 76/12* (2018.02); *G06F 2009/45595* (2013.01)

(58) Field of Classification Search
CPC .............................. H04W 40/16; H04W 76/32
See application file for complete search history.

(56) References Cited

U.S. PATENT DOCUMENTS

| | | | |
|---|---|---|---|
| 2017/0141973 A1 | 5/2017 | Vrzic | |
| 2017/0164212 A1 | 6/2017 | Opsenica et al. | |
| 2018/0077023 A1 | 3/2018 | Zhang | |
| 2019/0182875 A1* | 6/2019 | Talebi Fard | H04W 8/18 |
| 2019/0327317 A1* | 10/2019 | Lu | H04L 67/53 |

FOREIGN PATENT DOCUMENTS

| | | |
|---|---|---|
| CN | 108023757 A | 5/2018 |
| CN | 108270823 A | 7/2018 |

OTHER PUBLICATIONS

Bruno Dzogovic et al., Building virtualized 5G networks using open source software. 2018 IEEE Symposium on Computer Applications and Industrial Electronics (ISCAIE), Jul. 9, 2018, 7 pages.
Bo Han et al., Network function virtualization: Challenges and opportunities for innovations. IEEE Communications Magazine ( vol. 53, Issue: 2, Feb. 2015), Feb. 19, 2015, 8 pages.

(Continued)

*Primary Examiner* — Sulaiman Nooristany
(74) *Attorney, Agent, or Firm* — Rimon PC (57) ABSTRACT

The disclosure relates to a method for operating a network function, NF1, of a first network slice, NSI-2, wherein the method comprises establishing an end-to-end path from NF1 of NSI-2 to a network function, NF2, of a second network slice, NSI-1. Moreover, the disclosure relates to a corresponding communication network.

10 Claims, 5 Drawing Sheets

(56) References Cited

OTHER PUBLICATIONS

R. Vilalta et al., Network Slicing Using Dynamic Flex Ethernet over Transport Networks. 2017 European Conference on Optical Communication (ECOC), Apr. 26, 2018, 3 pages.
Beach, B. (Jan. 1, 2014). Virtual private cloud. In Pro Powershell for Amazon Web Services. Apress, 21 pages.
Timothy Wood et al., The case for enterprise-ready virtual private clouds. HotCloud 09: Proceedings of the 2009 conference on Hot topics in cloud computing, Jun. 1, 2009, 5 pages.
Bob Lantz et al., A Network in a Laptop: Rapid Prototyping for Software-Defined Networks. Hotnets 10, Oct. 20-21, 2010, Monterey, CA, USA, 6 pages.
Joao Martins et al., ClickOS and the Art of Network Function Virtualization. The Proceedings of the 11th USENIX Symposium on Networked Systems Design and Implementation (NSDI 14). Apr. 2, 2014 Seattle, WA, USA, 16 pages.
NGMN Alliance, Description of Network Slicing Concept. NGMN 5G P1 Requirements and Architecture Work Stream End-to-End Architecture. Jan. 13, 2016, 7 pages.
Kenofon Foukas et al., Network Slicing in 5G: Survey and Challenges. IEEE Communications Magazine ( vol. 55, Issue: 5, May 2017), May 12, 2017, 7 pages.
Konstantinos Samdanis et al., From network sharing to multi-tenancy: The 5G network slice broker. IEEE Communications Magazine ( vol. 54, Issue: 7, Jul. 1, 2016), Jul. 15, 2016, 8 pages.
Qi Zhang et al., Cloud computing: state-of-the-art and research challenges. Journal of Internet Services and Applications. vol. 1, Jan. 1, 2010, 12 pages.
What is VPC peering? Amazon Virtual Private Cloud. Retrieved from https://docs.aws.amazon.com/vpc/latest/peering/what-is-vpc-peering.html. Mar. 4, 2021, 1 page.
VPC Network Peering overview. Google Cloud. [Online]. Available: https://cloud.google.com/vpc/docs/vpc-peering. Mar. 4, 2021, 21 pages.
Jimdial, Azure Virtual Network peering. [Online]. Available: https://docs.microsoft.com/en-us/azure/virtual-network/virtual-network-peering-overview. Mar. 4, 2021, 6 pages.
Ben Pfaff et al., The Design and Implementation of Open vSwitch. The Proceedings of the 12th USENIX Symposium on Networked Systems Design and Implementation (NSDI 15). May 4, 2015 Oakland, CA, USA, 15 pages.
O. N. Foundation, OpenFlow Switch Specification 1.5. 1 (Protocol version 0x06). Mar. 26, 2015, 283 pages.
3GPP TS 23.501 V1.2.0 (Jul. 1, 2017), 3rd Generation Partnership Project; Technical Specification Group Services and System Aspects; System Architecture for the 5G System; Stage 2 (Release 15), 166 pages.
3GPP TS 23.502 V0.6.0 (Aug. 1, 2017), 3rd Generation Partnership Project; Technical Specification Group Services and System Aspects; Procedures for the 5G System; Stage 2 (Release 15), 148 pages.
3GPP TR 28.801 V2.0.1 (Sep. 1, 2017), 3rd Generation Partnership Project; Technical Specification Group Services and System Aspects; Telecommunication management; Study on management and orchestration of network slicing for next generation network(Release 15), 78 pages.

\* cited by examiner

INTER-SLICE SHARING IN 5G CORE NETWORKS

CROSS-REFERENCE TO RELATED APPLICATIONS

This application is a continuation of International Application No. PCT/EP2018/073142, filed on Aug. 28, 2018, the disclosure of which is hereby incorporated by reference in its entirety.

TECHNICAL FIELD

Generally, the present disclosure relates to the field of telecommunications. More specifically, the present disclosure relates to devices, systems and methods for inter-slice sharing in communication networks, in particular 5G core networks.

BACKGROUND

The next generation of mobile networks, i.e. 5G networks, is expected to support many new types of services and connections between various devices such as cars, wearables, sensors and actuators from both private and industrial environments. The new types of services and connections usually imply very distinct service requests on latency, data rate and so on, which naturally ask for different treatments and thereby pose challenges to the control of 5G networks.

In particular, supporting various new types of services has a deep impact on the core network architecture. In today's mobile networks, services mainly refer to the access of portable devices in human hands for data and voice services only. Core networks can apply basically the same treatment to portable devices following the best-effort principle. Hence, those services are predictable and how to respond them can be well preplanned. With various new service requests, however, service patterns will become quite heterogeneous. Consequently, service requests to a 5G network are difficult to predict. A proper way to meet the requirements is to agilely respond to any incoming services in a dynamic way.

Efficiently responding to distinct and unpredictable service requests is not an easy task. Administratively preplanning approaches with static network deployment do not work. Recently, Software-Defined Networking (SDN) and Network Function Virtualization (NFV) have been proposed as the two key enablers to realize a flexible and programmable network infrastructure. The idea behind SDN is to abstract everything as a flow and to move the complexity of flow treatment to a logically centralized element called SDN Controller (SDNC). Hence, the SDN view reduces all network elements to "dumb" flow treatment devices, which are only responsible for flow processing. With these concepts, SDN fuses all management and control plane (CP) intelligence at the SDNC. In return, the common abstraction and the locally available data simplify the development of network control and management applications. NFV further turns existing network functions, which were mainly implemented by dedicated and specialized hardware before, into virtualized function modules that can be easily deployed or removed as needed.

With this two enabling technologies, responding to new service requests becomes much easier than before given that any network functions (NFs) can be deployed/allocated on-demand (NFV's features) and forwarding behaviors of them can be remotely programmed (SDN's features), just like installing and running a computer program.

In the upcoming 5G era, services provided via mobile networks will not be limited to human communications and basic internet connections. Rather, it is expected that there will be an increasingly large number of services of vertical industries that will be provided through the wireless mobile network. The legacy best-effort quality-of-service (QoS) is however incapable of supporting heterogeneous services. For example, an ultra-low latency connectivity is required by eHealth services if a medical robot has to be precisely operated in real time for remote surgery. Another example is that a virtual reality (VR) live broadcast will need high throughput bandwidth and meanwhile low latency interactions in order to provide immersive entertainment experiences. Hence, 5G networks will have to guarantee various service level agreements (SLAs) for different customers but share the same physical infrastructure.

An approach to meet these different requirements is, firstly, a virtualization of the physical infrastructure as clouds using the SDN and NFV technologies mentioned above, whereby the physical infrastructure is converted to be fully programmable. Secondly, resource isolations are emphasized in order to provide performance guarantees. These two proposals generate a new technical concept, called network slicing, where multiple network tenants will have their own network resources that are isolated from each other and SLA-guaranteed. Such a portion of isolated network resources for one tenant is a virtualized logical network accommodated in the shared infrastructure, called a network slice instance (NSI). Highlighted as a key technology, in an NSI, its configurations and features (called slice type) are customized for particular customers. According to the current 3rd Generation Partnership Project System Aspects Working Group 2 (3GPP SA2) definitions, an NSI is an end-to-end networking capability for providing services.

In addition to highlighting features on customizations and resource isolations of the forthcoming network slicing technology, inter-slice sharing has been proposed, which poses technical challenges while is less considered so far. According to a current 3GPP definition, inter-slice sharing shall support two sharing cases. The first case is that a specific network function (NF) within one NSI can be shared with or used by another NSI. The second case is that a subset of an NSI can be shared or used to compose another NSI. Note that the latter case is a generalized case of the former one because a subset of an NSI includes multiple NFs. However, such a feature/functionality contradicts the spirit of slicing the network. In other words, slicing network resource advocates to split resources, rather than to share. This introduces a technical challenge for network slicing technology. Since network slicing technology is still in development and carrier grade solutions do not exist, two possible candidates have been proposed as the solution for inter-slice sharing.

The first solution is from 3GPP technical specifications. In 3GPP SA2, a service-based architecture (SBA) is proposed as the main architectural framework for the coming 5G. Different from the previous generations, SBA defines a modularized service model where NF communications happen over a service-based interface (SBI) bus, instead of dedicated point-to-point wired connections between hardware devices. The SBI bus decouples NFs and reference points that every NF has to associate. Based on SBA/SBI bus, network services can be provided via NF composition by chaining any needed NFs. One NF instance can be shared and associated with other NFs. Although NF sharing is supported, it is unclear how the SBA/SBI bus will support inter-slice NF sharing where NFs belonging to different NSIs should not be visible as normal NFs.

Given virtualized environment settings, it is natural to think whether existing solutions from cloud computing can be used. Virtual private cloud (VPC) peering proposed for interconnecting two virtual data centers seems to be an appropriate choice. A cloud resource provider provision computing resource in the cloud datacenter based on the request of a tenant. The provisioned resource is logically dedicated for that particular tenant and it is guaranteed according to the submitted order from the tenant, which is similar to network slicing scenario. Such a portion of provisioned resource is called as a VPC. In cloud infrastructure, one tenant may have multiple VPC instances, where they may be deployed in the same datacenter or geographically across different datacenters. In either case, the tenant may want its VPCs can form a whole private network that communicate with each other (e.g. private IP addressing). Therefore, the cloud infrastructure has to be able to establish such kind of interconnections, which is called VPC peering. However, as will be explained in more detail below, VPC peering cannot be trivially used as a solution for inter-slice sharing. First of all, VPC peering does not support overlapped addresses in the peered VPCs. Overlapped addresses can be avoided when planning, but peering two NSIs may not be able to plan when requesting the two NSIs. In other words, it is possible that initially the two NSIs were planned individually (thus possibly having overlapped private addresses on individual NSIs), and due to later on requirement, we have to peer the two NSIs. In this case, completely re-allocating addresses will be difficult because this may suspend and will have to stop the running services.

Secondly, between two VPCs, only one peering connection is supported. VPC peering is more like a routing table modification at the cloud datacenter layer. When a VPC is created, it is always connected to a gateway router that is either physical or virtual. If a VPC needs to access external, the gateway is configured to behave as a network address translation (NAT), otherwise all traffics are internally routable. When VPC peering is needed, on the two gateway nodes, routing policies will be modified so that the traffic from either VPC can get through. If necessary, a direct path can be established as well. However, in current cloud platforms, only one such a connection can be established, and in case of a partial visibility (e.g. some VMs should be still private), security policies have to be added, because, otherwise, two VPCs are connected as one domain. This, however, cannot fulfill the inter-slice NF sharing requirement.

Thus, there is still a need for devices, systems and methods for providing inter-slice NF sharing, in particular in 5G core networks.

SUMMARY

Embodiments of the disclosure are defined by the features of the independent claims, and further advantageous implementations of the embodiments by the features of the dependent claims.

Generally, embodiments of the disclosure provide a new interconnectivity technique for inter-slice sharing scenarios, which provide for point-to-point sharing when needed, while preserving slice isolation.

Comparing with existing peering techniques (i.e. SBI Bus and VPC peering), embodiments of the disclosure not only push to a finer interconnecting granularity, but also take service layer requirements into considerations in addition to basic transport layer connectivity, thereby offering a two-layer interconnecting scheme. Embodiments of the disclosure preserve the isolation where network interfaces will be created in dedicated networking namespaces, tunneling ports will be created at NSI gateway nodes, and the new interface and the tunneling port will be linked together so as to establish an end-to-end (E2E) path between target entities. According to embodiments of the disclosure isolation at the service layer is met by adding rules when building the E2E path at the transport layer. Based on the atomic inter-slice sharing operations implemented by embodiments of the disclosure, complex sharing scenarios (e.g. sub-slice sharing) can be composed as well. With smart implementation strategies embodiments of the disclosure can be implemented in a very efficient way.

More specifically, according to a first aspect the disclosure relates to a network device configured to operate a network function, NF1, of a first network slice, NSI-2, wherein the network device is configured to establish an end-to-end, in particular isolated path from NF1 of NSI-2 to a network function, NF2, of a second network slice, NSI-1.

In a further possible implementation form of the first aspect, NSI-2 defines a first network namespace and NSI-2 defines a second network namespace, wherein the network device is configured to provide a first interface in NSI-2 in a third network namespace for establishing the end-to-end isolated path from NF1 of NSI-2 to NF2 of NSI-1.

In a further possible implementation form of the first aspect, NSI-2 comprises a first communication entity, in particular virtual switch in the first network namespace, wherein NF1 is connected with the first communication entity, in particular virtual switch by a second interface, wherein NSI-1 comprises a second communication entity, in particular virtual switch in the second network namespace and wherein NF2 is connected with the second communication entity, in particular virtual switch by a third interface, wherein the network device is configured to provide the first interface in the third network namespace between NF1 and the first communication entity, in particular virtual switch for establishing at least a portion of the end-to-end isolated path from NF1 of NSI-2 to NF2 of NSI-1.

In a further possible implementation form of the first aspect, the network device is configured to provide the first interface in the third network namespace between NF1 and the first communication entity, in particular virtual switch by providing the first interface between NF1 and the first communication entity, in particular virtual switch in the first network namespace and assigning the first interface to the third network namespace.

In a further possible implementation form of the first aspect, the network device is configured to provide the first interface in the third network namespace between NF1 and the first communication entity, in particular virtual switch by further providing a port for NF1 on the first communication entity, in particular virtual switch.

In a further possible implementation form of the first aspect, the network device is further configured to provide a communication tunnel between NSI-2 and NSI-1 for establishing at least a portion of the end-to-end isolated path from NF1 of NSI-2 to NF2 of NSI-1.

In a further possible implementation form of the first aspect, the network device is further configured to provide the communication tunnel from a first communication tunnel port, in particular a first vxlan port, of the first communication entity, in particular virtual switch of NSI-2 to a second communication tunnel port, in particular a second vxlan port, of the second communication entity, in particular virtual switch of NSI-1.

In a further possible implementation form of the first aspect, the network device is configured to provide the first communication tunnel port such that the first communication tunnel port is configured to encapsulate and send packets with a host address to the second communication tunnel port.

In a further possible implementation form of the first aspect, the network device is configured to provide the second communication tunnel port such that the second communication tunnel port is configured to decapsulate packets received from the first communication tunnel port.

In a further possible implementation form of the first aspect, the network device is further configured to provide and/or adjust one or more forwarding rules in NSI-2 and/or one or more forwarding rules in NSI-1 for establishing at least a portion of the end-to-end isolated path from NF1 of NSI-2 to NF2 of NSI-1.

In a further possible implementation form of the first aspect, the network device is further configured to provide and/or adjust the one or more forwarding rules of a forwarding table of the first communication entity, in particular virtual switch of NSI-2 and/or the one or more forwarding rules of a forwarding table of the second communication entity, in particular virtual switch of NSI-1.

In a further possible implementation form of the first aspect, the network device is configured to provide and/or adjust the one or more forwarding rules of the forwarding table of the first communication entity, in particular virtual switch in such a way that a packet received by the first communication entity, in particular virtual switch from NF1 via the first interface between NF1 and the first communication entity, in particular virtual switch is forwarded to the first communication tunnel port of the first communication entity, in particular virtual switch.

In a further possible implementation form of the first aspect, the network device is configured to provide and/or adjust the one or more forwarding rules of the forwarding table of the second communication entity, in particular virtual switch in such a way that a packet received by the second communication entity, in particular virtual switch from the second communication tunnel port of the second communication entity, in particular virtual switch is forwarded to NF2.

In a further possible implementation form of the first aspect, the communication tunnel is unidirectional or bi-directional.

In a further possible implementation form of the first aspect, the network device is further configured to perform one or more transport layer adjustments on the basis of one or more service layer requirements for establishing at least a portion of the end-to-end isolated path from NF1 of NSI-2 to NF2 of NSI-1.

In a further possible implementation form of the first aspect, the one or more transport layer adjustments include adjusting the first interface between NF1 and the first communication entity, in particular virtual switch, adjusting one or more forwarding rules of the forwarding table of the first communication entity, in particular virtual switch, adjusting one or more forwarding rules of the forwarding table of the second communication entity, in particular virtual switch, and/or adjusting the communication tunnel from the first communication tunnel port of the first communication entity, in particular virtual switch to the second communication tunnel port of the second communication entity, in particular virtual switch.

In a further possible implementation form of the first aspect, the network device is configured to perform the one or more transport layer adjustments on the basis of a feedback loop.

According to a second aspect the disclosure relates to a corresponding method of operating a network function, NF1, of a first network slice, NSI-2, wherein the method comprises the step of establishing an end-to-end isolated path from NF1 of NSI-2 to a network function, NF2, of a second network slice, NSI-1.

In a further possible implementation form of the second aspect, NSI-2 defines a first network namespace and NSI-2 defines a second network namespace, wherein the step of establishing the end-to-end, in particular isolated path from NF1 of NSI-2 to NF2 of NSI-1 comprises the step of providing a first interface in NSI-2 in a third network namespace.

In a further possible implementation form of the second aspect, NSI-2 comprises a first communication entity, in particular virtual switch in the first network namespace, wherein NF1 is connected with the first communication entity, in particular virtual switch by a second interface, wherein NSI-1 comprises a second communication entity, in particular virtual switch in the second network namespace and wherein NF2 is connected with the second communication entity, in particular virtual switch by a third interface, wherein the step of establishing the end-to-end isolated path from NF1 of NSI-2 to NF2 of NSI-1 comprises providing the first interface in the third network namespace between NF1 and the first communication entity, in particular virtual switch.

In a further possible implementation form of the second aspect, the step of providing the first interface in the third network namespace between NF1 and the first communication entity, in particular virtual switch comprises providing the first interface between NF1 and the first communication entity, in particular virtual switch in the first network namespace and assigning the first interface to the third network namespace.

In a further possible implementation form of the second aspect, the step of providing the first interface in the third network namespace between NF1 and the first communication entity, in particular virtual switch further comprises providing a port for NF1 on the first communication entity, in particular virtual switch.

In a further possible implementation form of the second aspect, the step of establishing the end-to-end isolated path from NF1 of NSI-2 to NF2 of NSI-1 comprises providing a communication tunnel between NSI-2 and NSI-1.

In a further possible implementation form of the second aspect, the step of providing the communication tunnel comprises providing the communication tunnel from a first communication tunnel port, in particular a first vxlan port, of the first communication entity, in particular virtual switch to a second communication tunnel port, in particular a second vxlan port, of the second communication entity, in particular virtual switch.

In a further possible implementation form of the second aspect, the first communication tunnel port is configured to encapsulate and send packets with a host address to the second communication tunnel port.

In a further possible implementation form of the second aspect, the second communication tunnel port is configured to decapsulate packets received from the first communication tunnel port.

In a further possible implementation form of the second aspect, the first communication entity, in particular virtual switch is further configured to add an identifier of the second network slice instance to a packet received by the first communication entity, in particular virtual switch from the first network function via the first interface.

In a further possible implementation form of the second aspect, the step of establishing the end-to-end isolated path from NF1 of NSI-2 to NF2 of NSI-1 comprises providing and/or adjusting one or more forwarding rules in NSI-2 and/or one or more forwarding rules in NSI-1.

In a further possible implementation form of the second aspect, the step of establishing the end-to-end isolated path from NF1 of NSI-2 to NF2 of NSI-1 comprises providing and/or adjusting the one or more forwarding rules of a forwarding table of the first communication entity, in particular virtual switch and/or the one or more forwarding rules of a forwarding table of the second communication entity, in particular virtual switch.

In a further possible implementation form of the second aspect, the one or more forwarding rules of the forwarding table of the first communication entity, in particular virtual switch are adjusted in such a way that a packet received by the first communication entity, in particular virtual switch from NF1 via the first interface is forwarded to the first communication tunnel port.

In a further possible implementation form of the second aspect, the one or more forwarding rules of the forwarding table of the second communication entity, in particular virtual switch are adjusted in such a way that a packet received by the second communication entity, in particular virtual switch from the second communication tunnel port is forwarded to NF2.

In a further possible implementation form of the second aspect, the communication tunnel is unidirectional or bi-directional.

In a further possible implementation form of the second aspect, the method further comprises performing one or more transport layer adjustments on the basis of one or more service layer requirements.

In a further possible implementation form of the second aspect, the step of performing the one or more transport layer adjustments comprises adjusting the third interface, adjusting the one or more forwarding rules of a forwarding table of the first communication entity, in particular virtual switch, adjusting the one or more forwarding rules of a forwarding table of the second communication entity, in particular virtual switch, and/or adjusting the communication tunnel from the first communication tunnel port of the first communication entity, in particular virtual switch to the second communication tunnel port of the second communication entity, in particular virtual switch.

In a further possible implementation form of the second aspect, the one or more transport layer adjustments are performed on the basis of a feedback loop.

According to a third aspect the disclosure relates to a communication network comprising: a first network slice, NSI-2, with a network function, NF1; a second network slice, NSI-1, with a network function, NF2; and the network device according to the first aspect of the disclosure.

According to a fourth aspect the disclosure relates to a computer program product comprising program code for performing the method according to the second aspect when executed on a computer.

Details of one or more embodiments are set forth in the accompanying drawings and the description below. Other features, objects, and advantages will be apparent from the description, drawings, and claims.

BRIEF DESCRIPTION OF THE DRAWINGS

In the following embodiments of the disclosure are described in more detail with reference to the attached figures and drawings, in which.

In the following identical reference signs refer to identical or at least functionally equivalent features.

DETAILED DESCRIPTION OF THE EMBODIMENTS

In the following description, reference is made to the accompanying figures, which form part of the disclosure, and which show, by way of illustration, specific aspects of embodiments of the disclosure or specific aspects in which embodiments of the present disclosure may be used. It is understood that embodiments of the disclosure may be used in other aspects and comprise structural or logical changes not depicted in the figures. The following detailed description, therefore, is not to be taken in a limiting sense, and the scope of the present disclosure is defined by the appended claims.

For instance, it is understood that a disclosure in connection with a described method may also hold true for a corresponding device or system configured to perform the method and vice versa. For example, if one or a plurality of specific method steps are described, a corresponding device may include one or a plurality of units, e.g. functional units, to perform the described one or plurality of method steps (e.g. one unit performing the one or plurality of steps, or a plurality of units each performing one or more of the plurality of steps), even if such one or more units are not explicitly described or illustrated in the figures. On the other hand, for example, if a specific apparatus is described based on one or a plurality of units, e.g. functional units, a corresponding method may include one step to perform the functionality of the one or plurality of units (e.g. one step performing the functionality of the one or plurality of units, or a plurality of steps each performing the functionality of one or more of the plurality of units), even if such one or plurality of steps are not explicitly described or illustrated in the figures. Further, it is understood that the features of the various exemplary embodiments and/or aspects described herein may be combined with each other, unless specifically noted otherwise.

As will be described in more detail further below, embodiments of the disclosure provide devices, systems and methods for implementing inter-slice peering communications, i.e. inter-slice sharing. Embodiments of the disclosure provide solutions to two conflicting goals, where, on the one hand, such an inter-slice sharing (or peering) should be fine-grained and flexible enough and, on the other hand, the isolation of individual network slice instances (NSIs) is still preserved. Furthermore, embodiments of the disclosure provide for service layer peering, where even if inter-slice transport layer communication is possible, a specific service requirement is also taken care of. As will be appreciated from the following detailed description, embodiments of the disclosure can be easily deployed and automatized without introducing complex human interventions. In the following embodiments of the disclosure will be described in a bottom-up manner.

Generally, at the level of the transport layer embodiments of the disclosure are based on the following ideas for handling inter-slice transport layer sharing. Since an NSI is a logically isolated resource, any NF of the NSI is also isolated from and invisible to the external world. In order to peer two NFs contained in two different NSIs, embodiments of the disclosure establish a path, which is isolated as well. Embodiments of the disclosure create an end-to-end (E2E) path consisting of newly added interfaces and tunneling connections between the two NSIs. According to embodiments of the disclosure those additional interfaces, in particular ports, will be in a separate network namespace, which is invisible to the other NFs in the NSI the target NF is located in. Moreover, embodiments of the disclosure do not make the two NSIs fully visible to each other. Instead, according to embodiments of the disclosure special tunneling ports will be created on the gateway nodes where the NSI is NATed to the external world, and the special tunneling ports will link to the corresponding interfaces added on the target NF. Moreover, according to embodiments of the disclosure such a respective tunneling port will take QoS requirements into considerations, in order to fulfill the inter-slice sharing service level agreements (SLAs). According to embodiments of the disclosure, such a path can be unidirectional if the new interfaces and/or the tunneling ports are configured to be unidirectional.

At the level of the service layer embodiments of the disclosure are based on the following ideas for handling inter-slice service layer connectivity. Based on the connectivity provided by the transport layer, NFs in two different NSIs can send and receive messages between each other. At the service layer, such a communication capability will be further refined if particular restrictions are defined. Restrictions normally interpret the requirements from concrete business procedures. For the connected two NFs at two NSIs, a possible embodiment is that though the two NFs can exchange information, only one of them is allowed to further propagate the received/observed information, while the other NF is the last consumer. According to embodiments of the disclosure these restrictions can be realized when creating the new interfaces, where special rules will be added.

Figure 1:
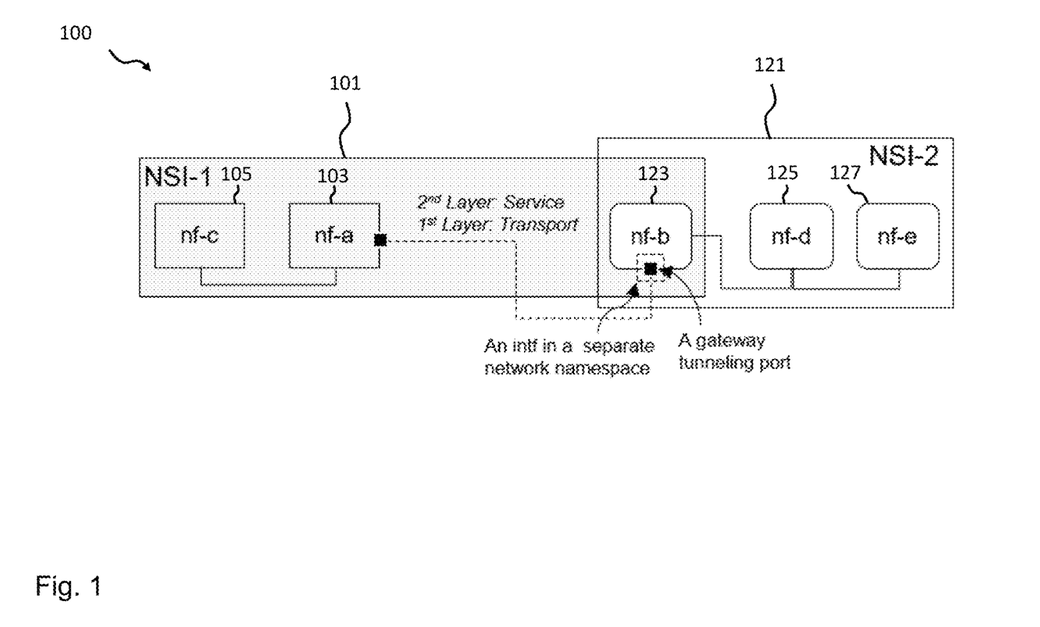
FIG. 1 is a high-level block diagram of a network architecture illustrating inter-slice sharing concepts implemented by embodiments of the disclosure.

More specifically, FIG. 1 illustrates a high-level architecture of a communication network 100 illustrating inter-slice sharing concepts implemented by embodiments of the disclosure. With the two-layer considerations for inter-slice sharing mentioned above communications between any specific NFs are under full control. Additionally, based on this atomic operations, more complicated scenarios can be composed, thus fulfilling any possible combinations of NF or sub-slice NFs sharing. In an embodiment, the communication network 100 is a 5G network.

The communication network 100 shown in FIG. 1 comprise two network slices or slices instances 101 and 121, referred to as NSI-1 and NSI-2. These two NSIs 102, 121 are isolated and invisible to each other in the sense that in both of these individual NSIs 102, 121 network functions (NFs), such as the NFs 103, 105, 123, 125 and 127 shown in FIGS. 1 and 2, have their own private network addresses and are interconnected by provisioned and private virtual links. In an embodiment, one or multiple NFs of an NSI 101, 121 may be instantiated on the same host node so that those NFs may share the same interface for communications. On the host node, the interface shared by the NFs can be referred to as a communication entity, in particular a virtual switch or gateway. More specifically, the virtual switch here is not the gateway of the whole NSI but an architecture view in virtualization. Alternatively, an NSI 101, 121 may not have a common gateway but a logical (virtual) private network, where any node of the private network can have a gateway to access the external world.

Figure 2:
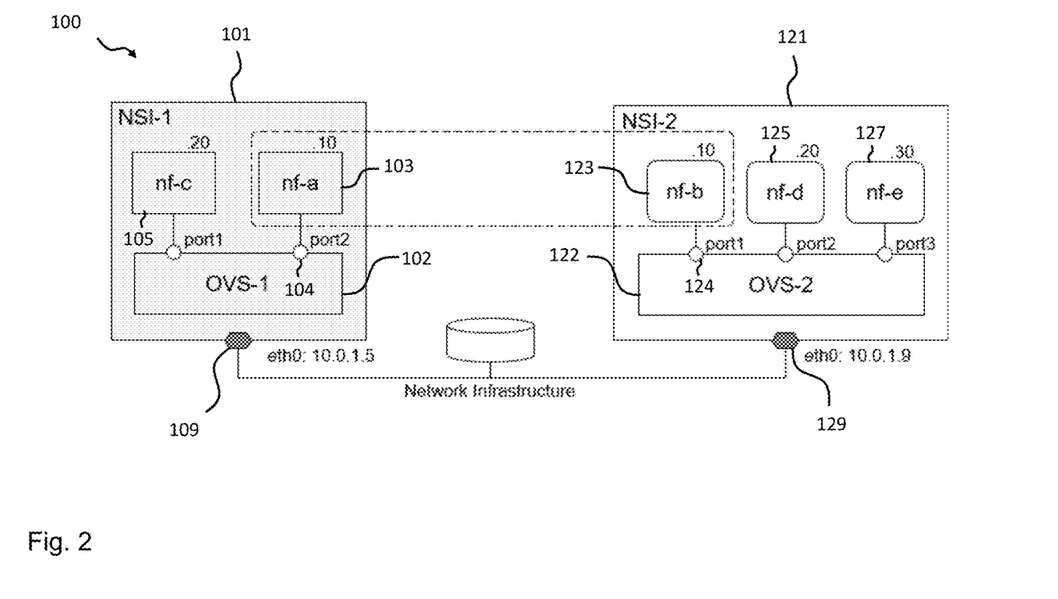
FIG. 2 is a block diagram showing a network architecture for implementing inter-slice sharing concepts according to embodiments of the disclosure.

Under further reference to FIG. 2, embodiments of the disclosure provide solutions to a unidirectional point-to-point inter-slice sharing problem where an NF (e.g. nf-b 123) from NSI-2 121 will have to be shared with an NF (e.g. nf-a 103) in NSI-1 101. The "unidirectional" requirement here means that NSI-2:nf-b, i.e. the NF nf-b 123 of NSI-2 121, is shared with NSI-1 only, while no NF from NSI-1 101 will be part of, i.e. shared with NSI-2 121. In order to avoid trivial cases, it is assumed that the two interested or target NFs 103, 123 are hosted on different nodes, i.e. each of them is associated with its own communication entity, i.e. virtual switch or gateway, namely NSI-1:gw 102 and NSI-2:gw 122, respectively. In an embodiment, the two NSIs 101, 121 can have the same private network address domain. In the exemplary embodiment shown in FIG. 1, every NF has an IP address from 192.168.10.x subnet. This illustrates one key difference to the conventional VPC peering scenario, where the peered VPCs have non-overlapping addresses, which requires substantial pre-planning. Nevertheless, a conventional VPC peering solution cannot be applied in this case, because it causes address re-allocation for the deployed NSIs 101, 121, which may introduce huge maintenance costs and suspend running services.

For providing inter-slice sharing at the transport layer, while keeping the respective addresses unchanged, embodiments of the disclosure make use of a dedicated network namespace so that an interface inside of the namespace can have an overlapping address. As shown in the exemplary embodiments of FIGS. 1 and 2 and under further reference to FIG. 3, NSI-2:nf-b 123 will create a new network namespace called ns:nf-b:NSI-1, preserved for inter-slice sharing with NSI-1:nf-a 103. Thereafter, in an embodiment, a local network pipe with two endpoints (interfaces) 126, 128 is created at the local host node. For one endpoint, it is added to a new port 128 created on the communication entity, in particular virtual switch or gateway 122, and for the other endpoint, it is assigned with an IP address that is legal in the domain of NSI-1 101. According to embodiments of the disclosure, the main purpose of the local path with the endpoints 126, 128 is to move to the dedicated network namespace (i.e. ns:nf-b:NSI-1) so that it becomes invisible to its current NSI domain and avoids address conflicts with other NFs.

Thus, a network device, such as a network management device or entity, is configured to operate the network function 123 of the first network slice NSI-2 121, wherein the network device is configured to establish an end-to-end isolated path from the network function 123 of NSI-2 121 to the network function 103 of NSI-1. In an embodiment, the network device can be a management layer entity, which can be implemented in various ways. For example, such a management entity could be logically centralized management layer entity. It could also be implemented using a multi-controller realization.

As already described above, in an embodiment, NSI-2 121 defines a first network namespace and NSI-2 101 defines a second network namespace, wherein the network device is configured to provide a first interface 126, 128 in NSI-2 121 in a third network namespace for establishing the end-to-end isolated path from NF1 123 of NSI-2 121 to NF2 103 of NSI-1 101.

In an embodiment, NSI-2 121 comprises the first communication entity, in particular virtual switch 122 in the first network namespace, wherein the network function 123 is connected with the first communication entity, in particular virtual switch 122 by a second interface, in particular port 124, wherein NSI-1 101 comprises the second communication entity, in particular virtual switch 102 in the second network namespace and wherein the network function 103 is connected with the second communication entity, in particular virtual switch 102 by a third interface, in particular port 104, wherein the network device is configured to provide the first interface, in particular two ports 126, 128, between the network function 123 and the first communication entity, in particular virtual switch 122 in the third network namespace different to the first network namespace and the second network namespace for establishing at least a portion of the end-to-end isolated path from the network function 123 of NSI-2 121 to the network function 103 of NSI-1 101.

In an embodiment, the network management device is configured to provide the first interface, in particular the ports 126, 128 in the third network namespace between the network function 123 and the first communication entity, in particular virtual switch 122 by providing the ports 126, 128 between the network function 123 and the first communication entity, in particular virtual switch 122 in the first network namespace and assigning the ports 126, 128 to the third network namespace.

After creating the local link and assigning addresses, the next step implemented by embodiments of the disclosure is to interconnect the target or interested NF (i.e. NSI-2:nf-b 123) with the NF 103 in the other NSI (i.e. NSI-1:nf-a 103). Technically, this requires having a dedicated path 110 between two host nodes. In the exemplary embodiment shown in the figures, NSI-1:nf-a 103 is hosted on a node 109 with its IP address H1=10.0.1.5 and NSI-2:nf-b 123 is hosted on a node 129 with its IP address H2=10.0.1.9. According to embodiments of the disclosure, the IP addresses of the two hosts can be in different domains as well, but routing capability can be assumed between the two hosts. According to an embodiment, the path 110 is a tunneling path 110, which can mimic a LAN visibility for the two NFs 103, 123. More specifically, as already mentioned above, two tunneling ports 111, 131 can be created on the two communication entities, e.g. virtual switches 102, 122, respectively.

Thus, in an embodiment, the network management device is further configured to provide the communication tunnel 110 from the first communication tunnel port 131 of the first communication entity, in particular virtual switch 122 to the second communication tunnel port 111 of the second communication entity, in particular virtual switch 102.

In an embodiment, the two tunneling ports 111, 131 can be vxlan tunneling ports 111, 131. If Open Virtual Switch (OVS) is used for providing the communication entities 102, 122 implemented as virtual switches 102, 122, the tunneling path 110 can be created on the local host by the following commands:

for NSI-1:gw 102:
$ ovs-vsctl add-port OVS-1 vxlan--set interface vxlan type=vxlan
options:remote_ip=10.0.1.9, options:key=flow options:dst_port=8472
for NSI-2:gw 122:
$ ovs-vsctl add-port OVS-2 vxlan--set interface vxlan type=vxlan
options:remote_ip=10.0.1.5, options:key=flow options:dst_port=8472

Figure 3:
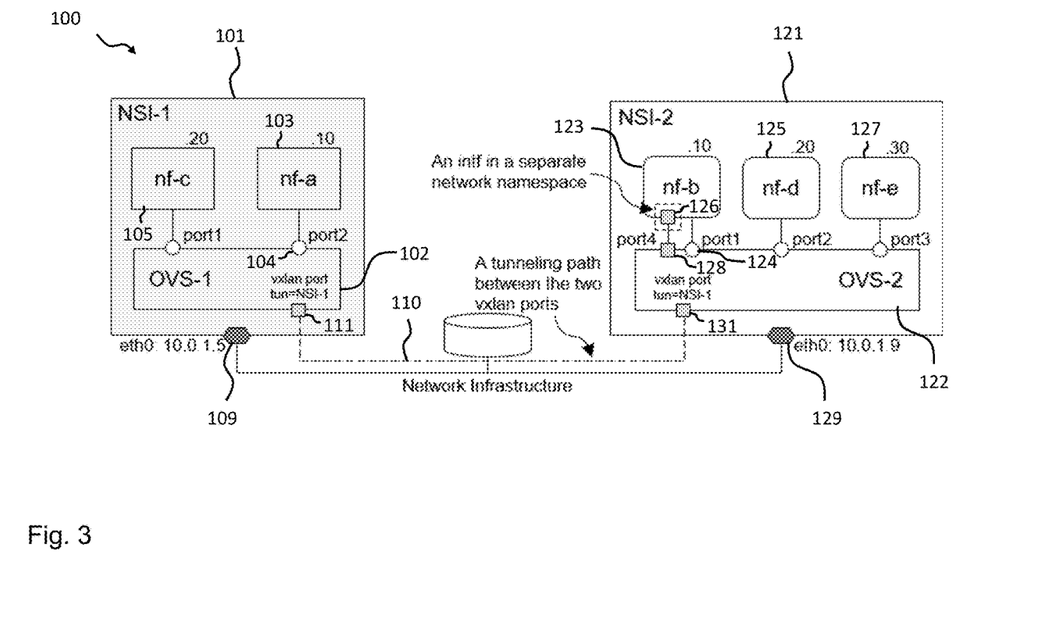
FIG. 3 is a block diagram showing the network architecture of FIG. 2 further including interfaces and a tunneling path implementing inter-slice sharing concepts according to embodiments of the disclosure.

In an embodiment, each vxlan port 111, 131 encapsulates and sends local IP packets with the host address. At the receiving end, the corresponding vxlan port 111, 131 decapsulates the received packet header and forwards to corresponding receivers by using original private addresses, as illustrated in FIG. 3.

Figure 4:
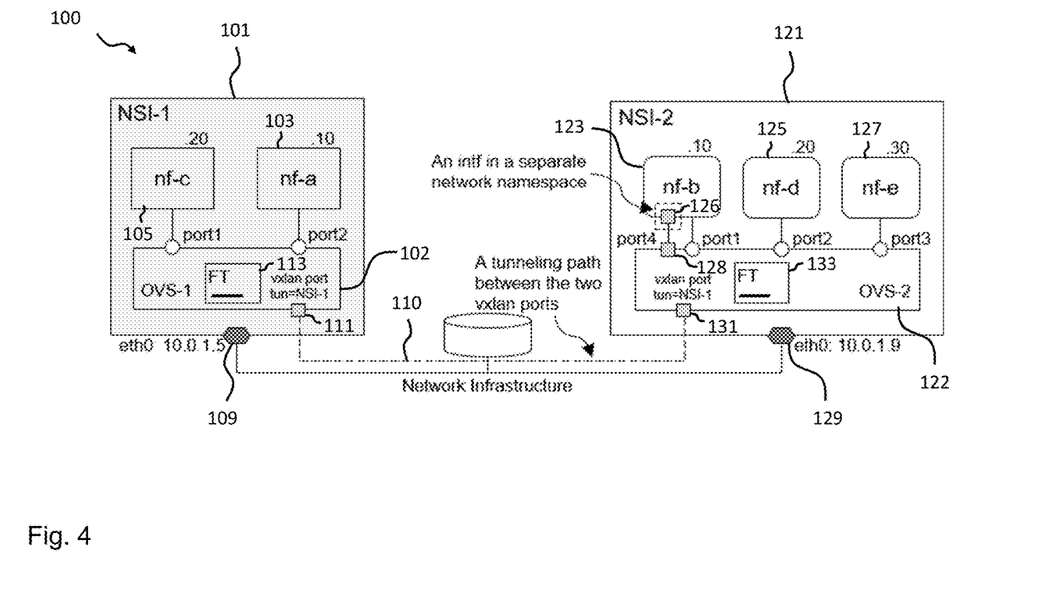
FIG. 4 is a block diagram showing the network architecture of FIG. 3 further including flow rule configuration tables implementing inter-slice sharing concepts according to embodiments of the disclosure.

Under further reference to FIG. 4, embodiments of the disclosure configure forwarding policies 113, 133 implemented on the respective communication entities, in particular virtual switches 102, 122 and link the interested NF 123 to the created tunneling port 131. As already described above, a local network pipe with the endpoints 126, 128 links the NF 123 to the communication entity, in particular virtual switch 122 (and one endpoint of the pipe link has a separated network namespace). Once data traffic from the NF 123 is sent to the pipe, it will arrive at the communication entity, in particular virtual switch 122 and has to be forwarded to the vxlan port 131 so that it can directly go through the tunneling path 110 to the other host. Similarly, once the vxlan port 131 receives any packet and decapsulates it, the packet has to be forwarded to a particular local destination according to the destination address. To this end, according to embodiments of the disclosure forwarding policies 113, 133 are provided and/or configured on the communication entities, in particular virtual switches 102, 122 for establishing the last piece of the E2E path between the NFs 103, 123.

Thus, in an embodiment, the network management device is further configured to provide and/or adjust the one or more forwarding rules or policies 133 defined in a forwarding table of the first communication entity, in particular virtual switch 122 and/or one or more forwarding rules or policies 113 defined in a forwarding table of the second communication entity, in particular virtual switch 102.

In an embodiment, the network management device is configured to adjust the one or more forwarding rules 133 of the forwarding table of the first communication entity, in particular virtual switch 122 in such a way that a data packet received by the first communication entity, in particular virtual switch 122 from the network function 123 via the two ports 126, 128 is forwarded to the first communication tunnel port 131. Likewise, in an embodiment, the network management device is configured to adjust the one or more forwarding rules 113 of the forwarding table of the second communication entity, in particular virtual switch 102 in such a way that a data packet received by the second communication entity, in particular virtual switch 102 from the second communication tunnel port 111 is forwarded to the network function 103.

Thus, in an embodiment, the forwarding policies 113, 133 can be as follows:

Concerning the communication entity, in particular virtual switch 122 of NSI-2 121, for packets, which are received from NSI-2:nf-b 123 (i.e. via port4 128 in the figures) and supposed to be shared with NSI-1:nf-a 103, the communication entity, in particular virtual switch 122 is configured to tag the packets with an NSI identifier (i.e. an identifier of NSI-1 101 in this case) and forward these to the vxlan port 131. For packets received from the vxlan port 131 (i.e. coming via the tunneling path 110 from NSI-1:nf-a 103), the vxlan port 131 decapsulates these packets and forwards the same to port4 128, in case their destination address is NSI-2:nf-b 123.

If OVS is used to implement the communication entity, in particular virtual switch NSI-2:gw 122, those forwarding policies 133 can be translated into the following forwarding rules of a forwarding or flow table:

table=0,  in_port=4,  actions=set_field:NSI-1->tun_id, resubmit(,1)
   table=0, resubmit(,1)
   table=1,   tun_id=NSI-1,   ip_dst=192.168.10.40, action=output:4
   table=1,   tun_id=NSI-1,   ip_dst=192.168.10.10, actions=output:vxlan On the communication entity, in particular virtual switch 102, for packets that are from NSI-1:nf-a 103 and send to NSI-2:nf-b 123 (i.e. NSI ID=NSI-1 and dst_ip=192.168.10.40), they are tagged with an NSI identifier (i.e. NSI-1) and forwarded to the vxlan port 111 of the communication entity, in particular virtual switch 102. Similarly, if OVS is used to implement the communication entity, in particular virtual switch NSI-1:gw 102, the forwarding policy 113 can be translated into the following forwarding rules and added into a forwarding or flow table:

table=0,  in_port=1,  actions=set_field:NSI-1->tun_id, resubmit(,1)
   table=0, resubmit(,1)
   table=1,   tun_id=NSI-1,   ip_dst=192.168.10.10, action=output:1
   table=1,   tun_id=NSI-1,   ip_dst=192.168.10.40, action=output:vxlan As will be appreciated, in the exemplary embodiment illustrated in the figures only NSI-2:nf-b 123 is shared with NSI-1 101, in particular NSI-1:nf-a 103 only. This is because, NSI-2:nf-b 123 has been assigned a legal address in NSI-1 101 and it is directly linked to NSI-1 101 through the new interface (in a dedicated network namespace), the vxlan port 131 as well as the new forwarding rules 133. In order to further share NSI-2:nf-b 123 to the other NFs 105, 107 in NSI-1 101, embodiments of the disclosure add corresponding forwarding rules to allow data traffic going through. On the other hand, no NF originally from NSI-1 101 is aware of NSI-2 121 still. The above configuration procedures can be used as an atomic procedure so that more complex scenarios can be composed.

Since an NSI, such as the NSIs 101, 121 illustrated in the figures, can involve more policies and SLA requirements at the service layer level, the inter-slice sharing scenario provided by embodiments of the disclosure can go far beyond the best-effort transport layer interconnectivity. At the service layer, certain types of requirements can still be related to the transport layer, such as bandwidth and latency. However, other types of requirements are often related to the business service flow, such as mutual authentications, certificate exchange and policy control. These different types of requirements can be handled by the network slice management plane, in particular an entity 140 illustrated in FIG. 5. More specifically, the network slice management plane 140 can be implemented to realize the different requirements across multiple NSIs. For instance, in the exemplary embodiment shown in the figures the established connection between NSI-1:nf-a 103 and NSI-2:nf-b 123 may have to satisfy a certain bandwidth and/or latency, or packet filtering policies have to be applied. Therefore, according to embodiments of the disclosure such requirement information can be exchanged between the corresponding entities over an interface. According to embodiments of the disclosure, this interface can be either a dedicated management port of each NSI 101, 121, or can reuse an existing data plane interface, depending on the implementation of the management plane channel.

Figure 5:
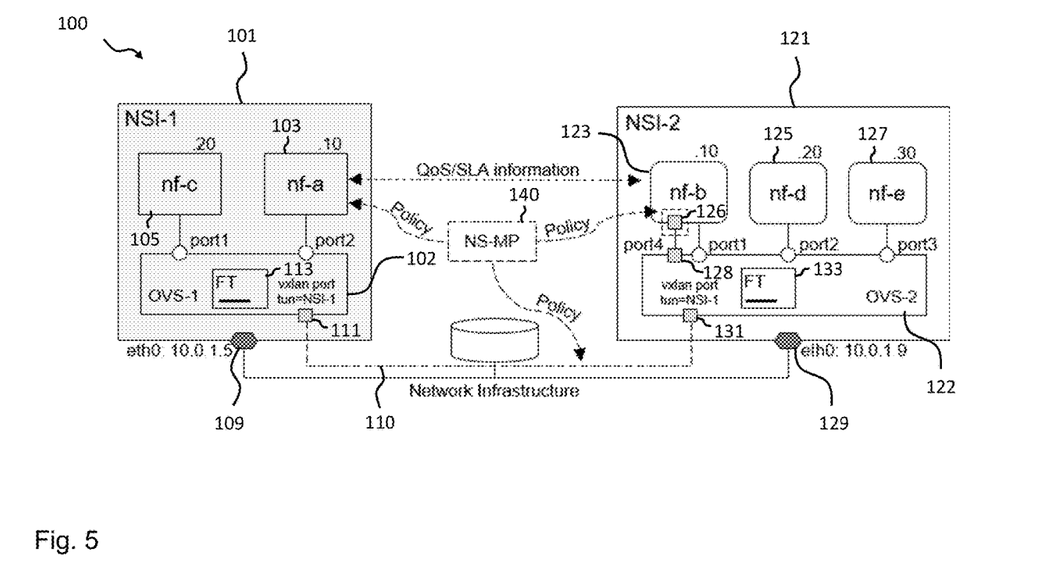
FIG. 5 is a block diagram showing the network architecture of FIG. 4 further including a management entity for service layer policy control according to embodiments of the disclosure.

After receiving the service layer requirement information, which can include corresponding configurations, these configurations can be applied. This can happen at the newly added interfaces 126, 128 and/or the communication entities, in particular virtual switches 102, 122, looking for an appropriate path for the inter-slice sharing, and even possible adjustments on the deployed NSIs 101, 121, if necessary, as illustrated in FIG. 5. According to embodiments of the disclosure such service layer considerations are not implemented as a one-shot configuration, but rather using a feedback loop procedure, which constantly checks whether any requirement cannot be met.

Thus, in an embodiment, the network management device is further configured to perform one or more transport layer adjustments on the basis of one or more service layer requirements, wherein the one or more transport layer adjustments can include adjusting the one or both of the two ports 126, 128 providing the first interface, adjusting one or more of the forwarding rules 133 defined in the forwarding table of the first communication entity, in particular virtual switch 122, adjusting one or more of the forwarding rules 113 defined by the forwarding table of the second communication entity, in particular virtual switch 102, and/or adjusting the communication tunnel 110, such as the hops, from the first communication tunnel port 131 of the first communication entity, in particular virtual switch 122 to the second communication tunnel port 111 of the second communication entity, in particular virtual switch 102.

The person skilled in the art will understand that the "blocks" ("units") of the various figures (method and apparatus) represent or describe functionalities of embodiments of the disclosure (rather than necessarily individual "units" in hardware or software) and thus describe equally functions or features of apparatus embodiments as well as method embodiments (unit=step).

In the several embodiments provided in the present application, it should be understood that the disclosed system, apparatus, and method may be implemented in other manners. For example, the described apparatus embodiment is merely exemplary. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may

The invention claimed is:

1. A method of operating a network function, NF1, of a first network slice, NSI-2, the method comprising:
providing a first interface in the NSI-2, wherein the NSI-2 defines a first network namespace, and wherein the first interface is between the NF1 and a first communication entity comprising a first virtual switch and is for establishing an end-to-end isolated path from the NF1 of the NSI-2 to an NF2 of an NSI-1 that defines a second network namespace, wherein the NSI-2 comprises the first communication entity, wherein the NF1 is connected with the first communication entity by a second interface, wherein the NSI-1 comprises a second communication entity, also comprising a virtual switch, in a third network namespace and wherein the NF2 is connected with the second communication entity by a third interface;
providing a communication tunnel between the NSI-2 and the NSI-1 from a first communication tunnel port of the first communication entity of the NSI-2 to a second communication tunnel port of the second communication entity, wherein the first communication tunnel port is configured to encapsulate and send packets with a host address to the second communication tunnel port and the second communication tunnel port is configured to decapsulate packets received from the first communication tunnel port;
providing and/or adjusting a forwarding rule in the NSI-2 or in the NSI-1; and
establishing the end-to-end isolated path from the NF1 to the NF2.

2. The method of claim 1, further comprising: providing the first interface in the second network namespace between the NF1 and the first communication entity by providing the first interface between the NF1 and 2 of 10.

3. The method of claim 2, further comprising:
providing the first interface in the second network namespace between the NF1 and the first communication entity by further providing a port for the NF1 on the first communication entity.

4. The method of claim 1, further comprising:
providing and/or adjusting the one or more forwarding rules of a forwarding table of a first communication entity of the NSI-2 and/or the one or more forwarding rules of a forwarding table of a second communication entity of the NSI-1.

5. The method of claim 4, wherein providing and/or adjusting the one or more forwarding rules of the forwarding table of the first communication entity comprises:
providing and/or adjusting the one or more forwarding rules of the forwarding table of the first communication entity in such a way that a packet received by the first communication entity from the NF1 via a first interface between the NF1 and the first communication entity is forwarded to a first communication tunnel port of the first communication entity.

6. The method of claim 4, wherein providing and/or adjusting the one or more forwarding rules of the forwarding table of the second communication entity comprises:
forwarding a packet to the NF2, wherein the packet is received by the second communication entity from a second communication tunnel port of the second communication entity, wherein the second communication entity comprises a virtual switch.

7. The method of claim 1, further comprising:
performing one or more transport layer adjustments on the basis of one or more service layer requirements for establishing the end-to-end isolated path from the NF1 of the NSI-2 to the NF2 of the NSI-1.

8. The method of claim 7, wherein the one or more transport layer adjustments include adjusting at least one of:
a first interface between the NF1 and a first communication entity of the NSI-2, one or more forwarding rules of a forwarding table of the first communication entity, one or more forwarding rules of a forwarding table of a second communication entity of the NSI-1, and a communication tunnel from a first communication tunnel port of the first communication entity to a second communication tunnel port of the second communication entity.

9. The method of claim 7, comprising:
performing the one or more transport layer adjustments on the basis of a feedback loop.

10. A communication network comprising:
a first network slice, NSI-2, with including a network function, NF1, wherein the NSI-2 defines a first network namespace;
a second network slice, NSI-1, with including a network function, NF2, wherein the NSI-1 defines a second network namespace,
wherein, the NF1 of the NSI-2 is connected with the NF2 of the NSI-1 via an end-to-end isolated path, wherein the NSI-2 comprises a first communication entity including one or more first processors in communication with a first non-volatile memory and wherein the NF1 is connected with the first communication entity by a second interface, wherein the NSI-1 comprises a second communication entity also including one or more second processors in communication with a second non-volatile memory, in a third network namespace, and wherein the NF2 is connected with the second communication entity by a third interface; and
a first interface is provided in the NSI-2, between the NF1 and the first communication entity, for establishing the end-to-end isolated path; and
a communication tunnel between the NSI-2 and the NSI-1 from a first communication tunnel port of the first communication entity of the NSI-2 to a second communication tunnel port of the second communication entity, wherein the NSI-2 or the NSI-1 includes a forwarding rule;
wherein the first communication tunnel port is configured to encapsulate and send packets with a host address to the second communication tunnel port and the second communication tunnel port is configured to decapsulate packets received from the first communication tunnel port;
wherein the first communication entity comprising a first virtual switch and wherein the second communication entity comprising a second first virtual switch.

* * * * *

UNITED STATES PATENT AND TRADEMARK OFFICE
CERTIFICATE OF CORRECTION

PATENT NO. : 12,069,559 B2
APPLICATION NO. : 17/183799
DATED : August 20, 2024
INVENTOR(S) : Chenghui Peng et al.

It is certified that error appears in the above-identified patent and that said Letters Patent is hereby corrected as shown below:

In the Claims

In Column 15, Line 11, in Claim 1, delete "1. 1." and insert -- 1. --.

In Column 15, Line 44, in Claim 2, delete "2 of 10." and insert -- the first communication entity in the first network namespace and assigning the first interface to the second network namespace. --.

In Column 16, Line 28, in Claim 10, after "2," delete "with".

In Column 16, Line 31, in Claim 10, after "1," delete "with".

In Column 16, Line 45, in Claim 10, after "interface;" delete "and".

Signed and Sealed this
Twenty-ninth Day of October, 2024

Katherine Kelly Vidal
*Director of the United States Patent and Trademark Office*